(12) United States Patent
Spangler et al.

(10) Patent No.: US 9,771,814 B2
(45) Date of Patent: Sep. 26, 2017

(54) TOLERANCE RESISTANCE COVERPLATES

(71) Applicant: United Technologies Corporation, Hartford, CT (US)

(72) Inventors: Brandon W. Spangler, Vernon, CT (US); Ky H. Vu, East Hartford, CT (US); Jeffrey J. DeGray, Hampden, MA (US); Ryan Alan Waite, South Windsor, CT (US); Gina Cavallo, Watertown, CT (US); Thomas P. Dziuba, Northford, CT (US)

(73) Assignee: United Technologies Corporation, Farmington, CT (US)

( * ) Notice: Subject to any disclaimer, the term of this patent is extended or adjusted under 35 U.S.C. 154(b) by 274 days.

(21) Appl. No.: 14/641,470

(22) Filed: Mar. 9, 2015

(65) Prior Publication Data

US 2016/0265372 A1 Sep. 15, 2016

(51) Int. Cl.
*F01D 5/02* (2006.01)
*F01D 9/04* (2006.01)
*F01D 25/12* (2006.01)
*F04D 29/32* (2006.01)
*F01D 5/18* (2006.01)

(52) U.S. Cl.
CPC .............. *F01D 9/041* (2013.01); *F01D 5/02* (2013.01); *F01D 5/189* (2013.01); *F01D 25/12* (2013.01);
(Continued)

(58) Field of Classification Search
CPC . F01D 5/02; F01D 5/189; F01D 25/12; F01D 9/041; F04D 29/321;
(Continued)

(56) References Cited

U.S. PATENT DOCUMENTS 3,936,216 A 2/1976 Dixon
3,990,812 A 11/1976 Radtke
(Continued)

FOREIGN PATENT DOCUMENTS

EP 2612995 A2 7/2013
EP 2613004 A2 7/2013

OTHER PUBLICATIONS

PCT/US2014/064041 (not yet published).
European Search Report for European Application No. 16159496.5 mailed Jul. 21, 2016.

*Primary Examiner* — Igor Kershteyn
(74) *Attorney, Agent, or Firm* — Carlson, Gaskey & Olds, PC

(57) ABSTRACT

A gas turbine engine component assembly comprises a first component and a second component circumferentially spaced from the first component relative to an engine center axis. A first baffle is associated with the first component. A second baffle is associated with the second component. Each of the first and second baffles includes at least one radial baffle tab. A gap is between the first and second baffles to define a cooling air inlet. A first coverplate is associated with the first baffle to cover a first portion of the gap. A second coverplate is associated with the second baffle to cover a second portion of the gap. The first and second coverplates are separate from each other, and include at least one coverplate radial tab that cooperates with an associated at least one baffle radial tab to prevent leakage gaps between the first and second baffle plates and the first and second coverplates.

18 Claims, 9 Drawing Sheets

(52) U.S. Cl.
CPC ........ F04D 29/321 (2013.01); *F05D 2220/32* (2013.01); *F05D 2230/21* (2013.01); *F05D 2230/642* (2013.01); *F05D 2240/126* (2013.01); *F05D 2240/80* (2013.01); *F05D 2260/20* (2013.01); *F05D 2260/30* (2013.01); *Y02T 50/676* (2013.01)

(58) Field of Classification Search
CPC ............. F04D 2220/32; F05D 2230/21; F05D 2230/642; F05D 2240/126; F05D 2240/80; F05D 2260/20; F05D 2260/30; Y02T 50/676
See application file for complete search history.

(56) References Cited

U.S. PATENT DOCUMENTS

| | | | |
|---|---|---|---|
| 4,359,310 A * | 11/1982 | Endres | .................... F01D 5/187 415/115 |
| 6,386,825 B1 | 5/2002 | Burdgick | |
| 6,398,486 B1 * | 6/2002 | Storey | ..................... F01D 5/188 415/114 |
| 6,418,618 B1 | 7/2002 | Burdgick | |
| 7,104,756 B2 * | 9/2006 | Harding | ................... F01D 5/189 416/233 |
| 8,123,466 B2 | 2/2012 | Pietraszkiewicz et al. | |
| 8,251,665 B2 * | 8/2012 | Baldauf | ..................... F01D 5/22 416/193 A |
| 8,439,629 B2 | 5/2013 | Pietraszkiewicz et al. | |
| 8,562,285 B2 | 10/2013 | McCaffrey et al. | |
| 8,651,802 B2 | 2/2014 | Bergman et al. | |
| 8,708,652 B2 | 4/2014 | Caprario et al. | |
| 8,740,554 B2 | 6/2014 | Virkler et al. | |
| 8,800,133 B2 | 8/2014 | Caprario et al. | |
| 8,870,544 B2 | 10/2014 | Caprario | |
| 2009/0067978 A1 | 3/2009 | Suljak | |
| 2009/0246023 A1 * | 10/2009 | Chon | ...................... F01D 5/188 416/95 |
| 2013/0315725 A1 | 11/2013 | Uechi et al. | |
| 2014/0086740 A1 | 3/2014 | Arnold | |
| 2014/0190181 A1 | 7/2014 | Borja et al. | |

* cited by examiner

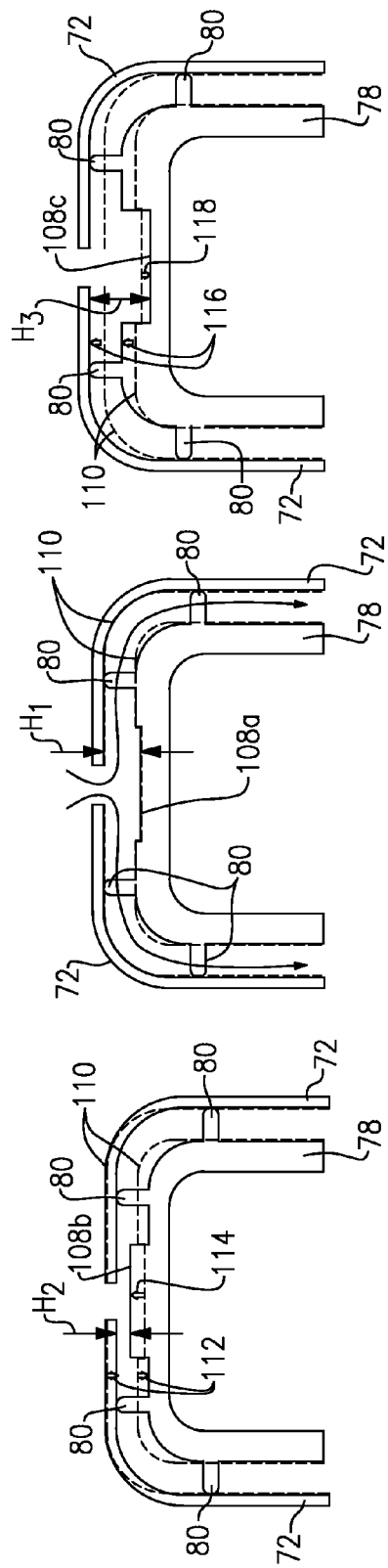

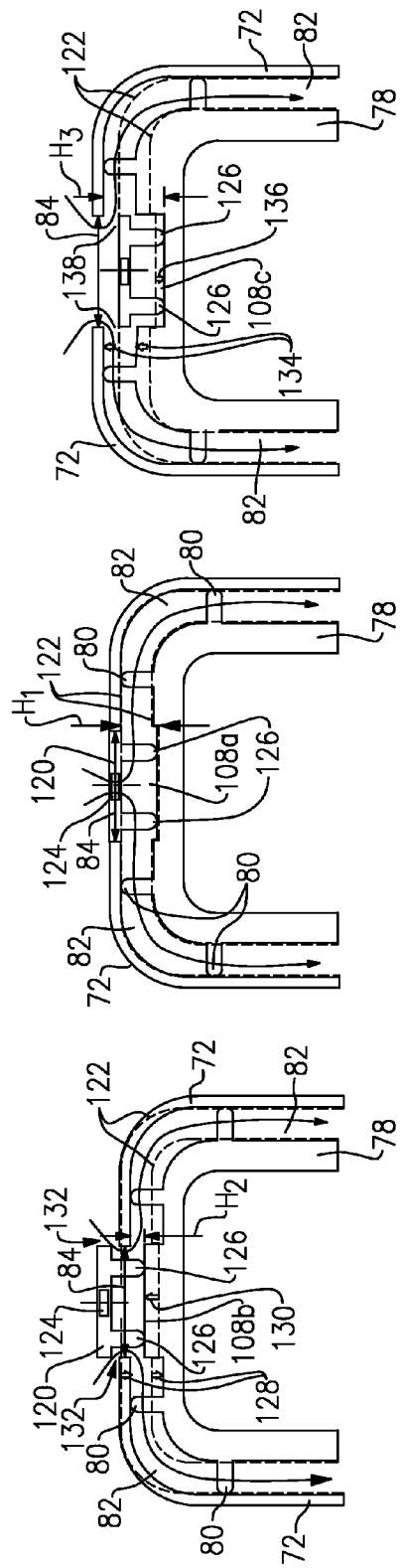

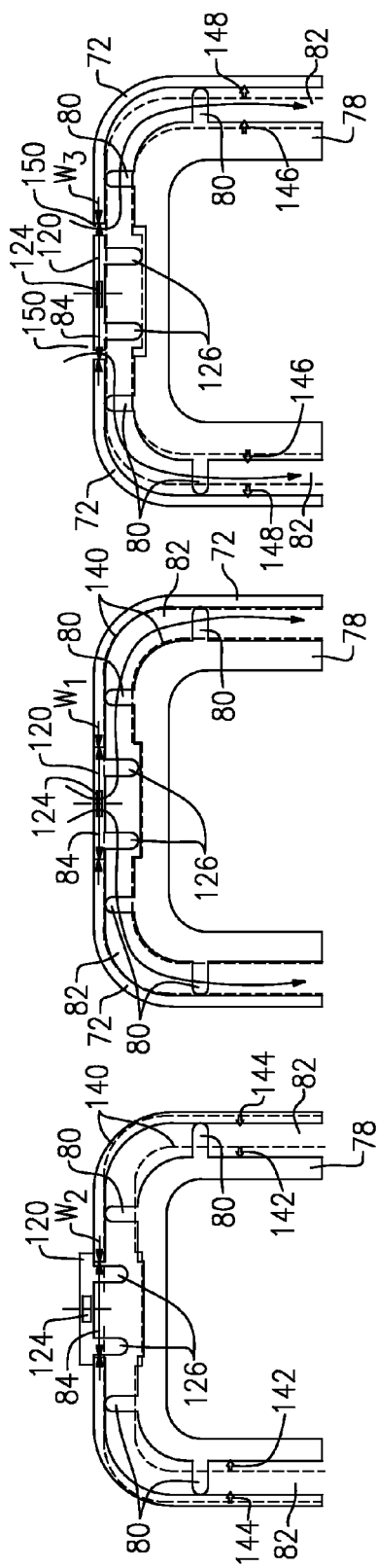

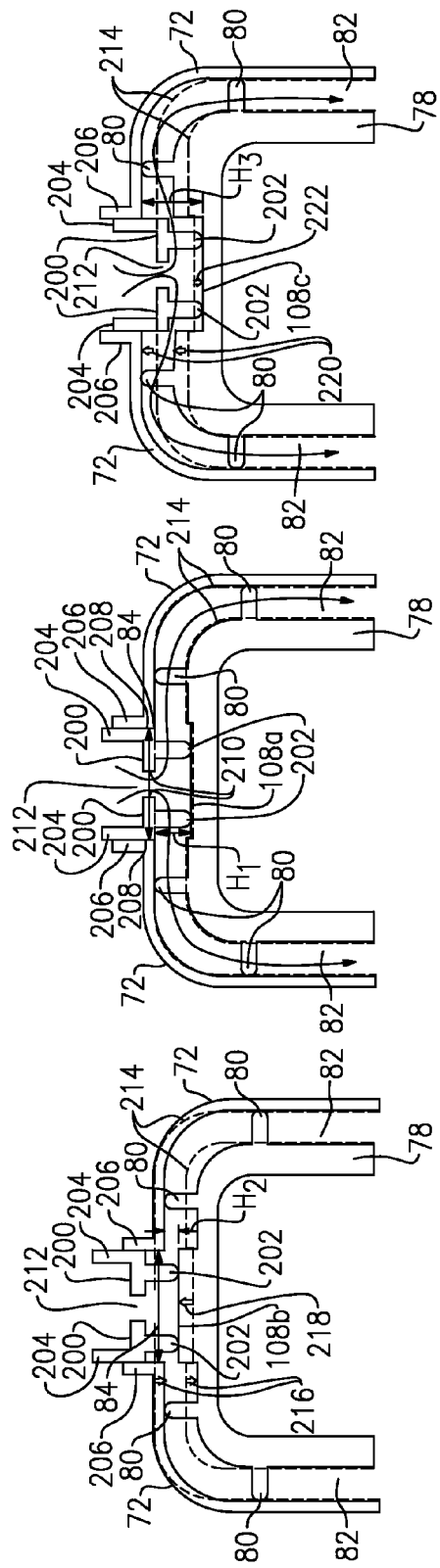

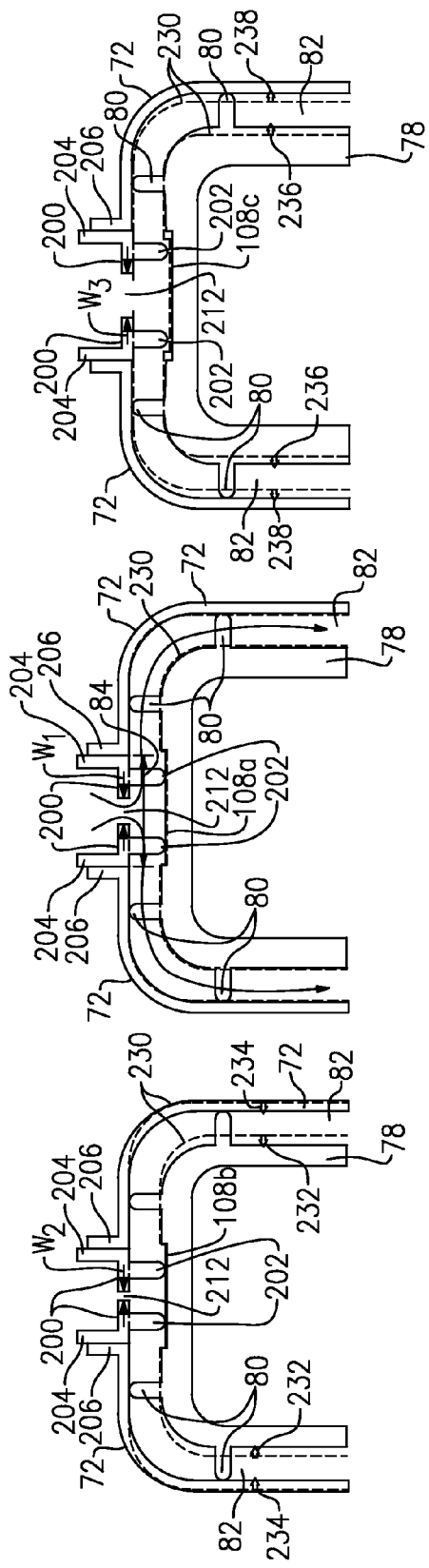

TOLERANCE RESISTANCE COVERPLATES

STATEMENT REGARDING FEDERALLY SPONSORED RESEARCH OR DEVELOPMENT

This invention was made with government support under Contract No. FA8650-09-D-2923-0021, awarded by the United States Air Force. The Government has certain rights in this invention.

BACKGROUND OF THE INVENTION

A core engine of a gas turbine engine typically includes a multistage compressor which provides compressed air to a combustor wherein it is mixed with fuel and ignited for generating hot combustion gas which flows downstream through a high pressure turbine nozzle, and in turn through one or more stages of turbine rotor blades. The high pressure turbine blades are joined to a rotor disk which is joined to the compressor by a corresponding drive shaft, with the turbine blades extracting energy for powering the compressor during operation. In a two spool engine, a second shaft joins a fan upstream of the compressor to a low pressure turbine disposed downstream from the high pressure turbine.

In one known configuration, the turbine includes doublet vane segments that that are attached to each other at circumferentially spaced edges. Each segment typically includes an outer vane platform segment, an inner vane platform segment, and a pair of vanes extending radially between the inner and outer vane platform segments. The vanes comprise airfoils that are subjected to cooling air flow.

In one known engine configuration, airfoil cooling air is utilized to cool the platform before sending the air into the airfoils. Space-eater baffles and coverplates are used to create channels through which the air flows. In this configuration, the cooling air is required to enter at a certain location and must maintain a relatively constant channel height in order to provide the necessary cooling. However, when radial and circumferential core shifts and tolerances are taken into account, using conventional baffles and coverplates could either result in large fluctuations in channel heights or cause leakage gaps to open up. This reduces cooling effectiveness in the platform region.

SUMMARY OF THE INVENTION

In a featured embodiment, a gas turbine engine component assembly comprises a first component and a second component circumferentially spaced from the first component relative to an engine center axis. A first baffle is associated with the first component. A second baffle is associated with the second component. Each of the first and second baffles includes at least one radial baffle tab. A gap is between the first and second baffles to define a cooling air inlet. A first coverplate is associated with the first baffle to cover a first portion of the gap. A second coverplate is associated with the second baffle to cover a second portion of the gap. The first and second coverplates are separate from each other, and include at least one coverplate radial tab that cooperates with an associated at least one baffle radial tab to prevent leakage gaps between the first and second baffle plates and the first and second coverplates.

In another embodiment according to the previous embodiment, the first and second coverplates each include at least one plate standoff extending in a radial direction opposite from the at least one coverplate radial tab.

In another embodiment according to any of the previous embodiments, the at least one plate standoff and the at least one coverplate radial tab are circumferentially offset from each other.

In another embodiment according to any of the previous embodiments, a tolerance range is defined between a first set of tolerances and a second set of tolerances with a nominal tolerance condition being defined between the first and second sets of tolerances. A channel is provided between a baffle surface of the first and second baffles and a component surface of the first and second components. A nominal channel height is defined at the nominal tolerance condition. The at least one baffle radial tab and the at least one coverplate radial tab are located at a first position relative to each other when in the nominal tolerance condition. The at least one baffle radial tab and the at least one coverplate radial tab are located at a second position wherein the coverplate radial tab is radially outward of the first position and the baffle radial tab is radially inward of the first position when at the first set of tolerances. The at least one baffle radial tab and the at least one coverplate radial tab are located at a third position wherein the coverplate radial tab is radially inward of the first position and the baffle radial tab is radially outward of the first position when at the second set of tolerances.

In another embodiment according to any of the previous embodiments, a tolerance range is defined between a first set of tolerances and a second set of tolerances with a nominal tolerance condition being defined between the first and second sets of tolerances. A plate gap is provided between the first and second coverplates. A nominal plate gap is defined at the nominal tolerance condition. The plate gap is defined by a first distance when in the nominal tolerance condition. The plate gap is defined by a second distance that is circumferentially decreased relative to the first distance when at the first set of tolerances. The plate gap is defined by a third distance that is circumferentially increased relative to the first distance when at the second set of tolerances.

In another embodiment according to any of the previous embodiments, the first component comprises a first airfoil extending from a platform and the second component comprises a second airfoil extending from a platform.

In another embodiment according to any of the previous embodiments, the first and second airfoils comprise vanes.

In another embodiment according to any of the previous embodiments, the first and second baffles include a baffle surface that faces an airfoil surface, and include channels formed between the baffle and airfoil surfaces. The first and second coverplates are positioned within the gap and spaced apart from each other to define an air inlet into the channels.

In another embodiment according to any of the previous embodiments, the coverplate radial tabs and the baffle radial tabs are positioned at different radial positions relative to each other to maintain a desired channel height throughout a tolerance range defined by the first and second airfoils.

In another embodiment according to any of the previous embodiments, the air inlet varies in a circumferential direction throughout the tolerance range.

In another featured embodiment, a gas turbine engine comprises a compressor section defining an engine center axis. A turbine section is downstream of the compressor section, and includes a plurality of vane segments that are circumferentially attached to each other to form an array of vanes. At least one of the vane segments comprises a first baffle associated with a first vane. A second baffle is associated with a second vane. Each of the first and second baffles includes at least one baffle radial tab. A gap between the first and second baffles defines a cooling air inlet. A first coverplate is associated with the first baffle to cover a first portion of the gap. A second coverplate is associated with the second baffle to cover a second portion of the gap. The first and second coverplates are separate from each other and each of the first and second coverplates includes at least one coverplate radial tab that cooperates with an associated baffle radial tab to prevent leakage gaps between the first and second baffle plates and the first and second coverplates.

In another embodiment according to the previous embodiment, the first and second coverplates each include at least one plate standoff extending in a radial direction opposite from the at least one coverplate radial tab.

In another embodiment according to any of the previous embodiments, the at least one plate standoff and the at least one coverplate plate tab are circumferentially offset from each other.

In another embodiment according to any of the previous embodiments, associated coverplate radial tabs and baffle radial tabs are in direct abutting engagement with each other.

In another embodiment according to any of the previous embodiments, the first and second baffles include a baffle surface that faces a vane surface, and include channels formed between the baffle and airfoil surfaces. The first and second coverplates are positioned within the gap and spaced apart from each other to define the cooling air inlet into the channels.

In another embodiment according to any of the previous embodiments, the coverplate radial tabs and the baffle radial tabs are positioned at different radial positions relative to each other to maintain a desired channel height throughout a tolerance range defined by the first and second vanes.

In another embodiment according to any of the previous embodiments, the cooling air inlet varies in a circumferential direction throughout the tolerance range.

In another embodiment according to any of the previous embodiments, the cooling air inlet decreases in size relative to a nominal tolerance size when vanes are positioned circumferentially closer to each other than when the vanes are positioned at a nominal tolerance distance.

In another embodiment according to any of the previous embodiments, the cooling air inlet increases in size relative to a nominal tolerance size when vanes are positioned circumferentially father apart from each other than when the vanes are positioned at a nominal tolerance distance.

In another embodiment according to any of the previous embodiments, each of the first and second coverplates includes a base plate extending between circumferentially spaced edges with the at least one radial plate tab extending radially outwardly from one of the edges.

The foregoing features and elements may be combined in any combination without exclusivity, unless expressly indicated otherwise.

These and other features may be best understood from the following drawings and specification.

BRIEF DESCRIPTION OF THE DRAWINGS

FIG. 7A is a view similar to FIG. 6 and which shows a nominal height condition.
FIG. 7B is similar to FIG. 7A but shows a minimum height condition for radial tolerances.
FIG. 7C is similar to FIG. 7A but shows a maximum height condition for radial tolerances.
FIG. 8A is a view similar to FIG. 7A but shows a single piece coverplate positioned between baffles in a nominal height condition.
FIG. 8B is similar to FIG. 8A but shows a minimum height condition for radial tolerances.
FIG. 8C is similar to FIG. 8A but shows a maximum height condition for radial tolerances.
FIG. 9A is a view similar to FIG. 8A but shows the single piece coverplate in a nominal width condition.
FIG. 9B is similar to FIG. 9A but shows a minimum width condition for circumferential tolerances.
FIG. 9C is similar to FIG. 9A but shows a maximum width condition for circumferential tolerances.
FIG. 10A is a view similar to FIG. 8A but shows separate coverplates positioned between baffles in a nominal height condition.
FIG. 10B is similar to FIG. 10A but shows a minimum height condition for radial tolerances.
FIG. 10C is similar to FIG. 10A but shows a maximum height condition for radial tolerances.
FIG. 11A is a view similar to FIG. 9A but shows the separate coverplates in a nominal width condition.
FIG. 11B is similar to FIG. 11A but shows a minimum width condition for circumferential tolerances.
FIG. 11C is similar to FIG. 11A but shows a maximum width condition for circumferential tolerances.

DETAILED DESCRIPTION

Figure 1:
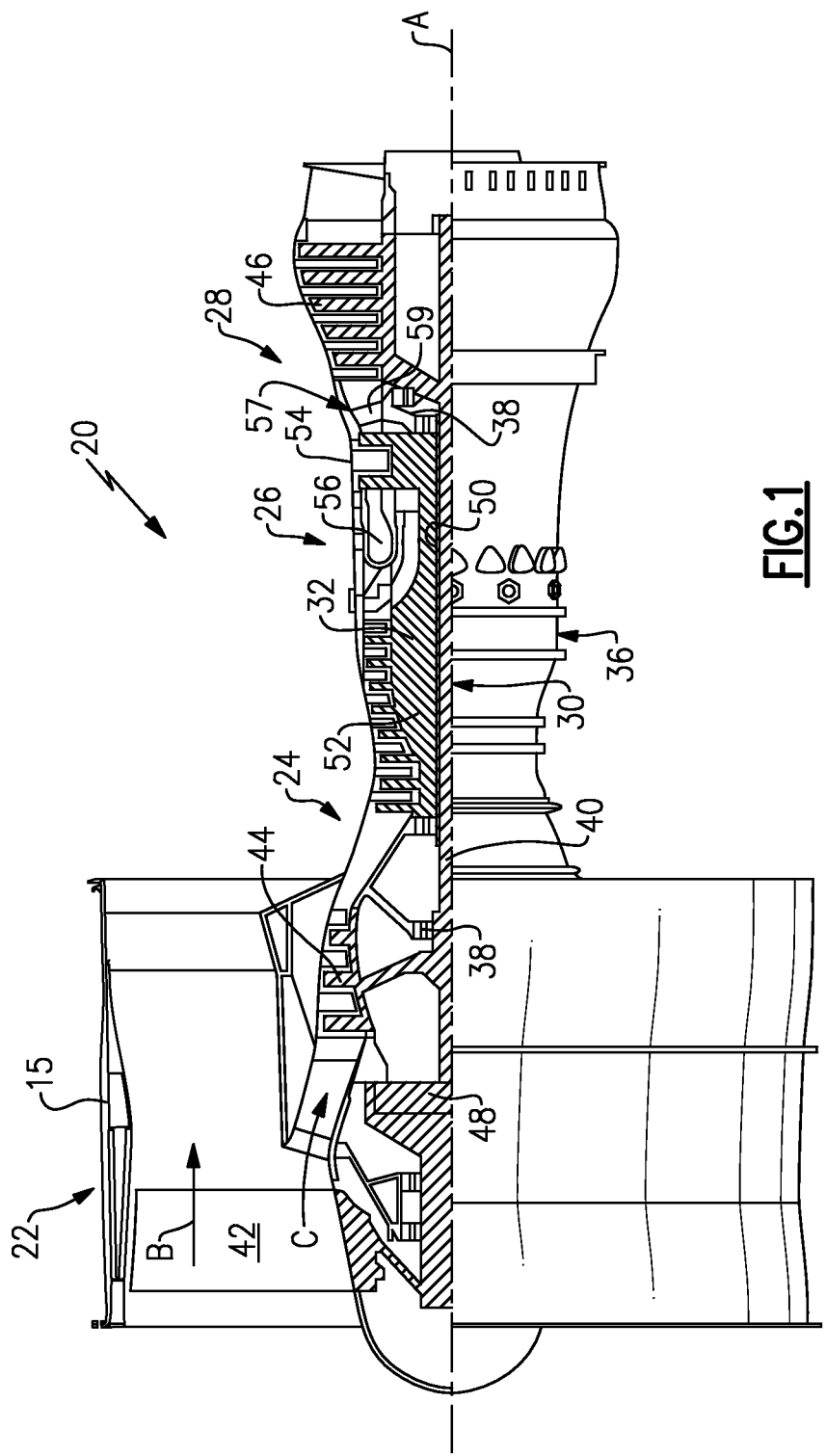
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a second (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a first (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
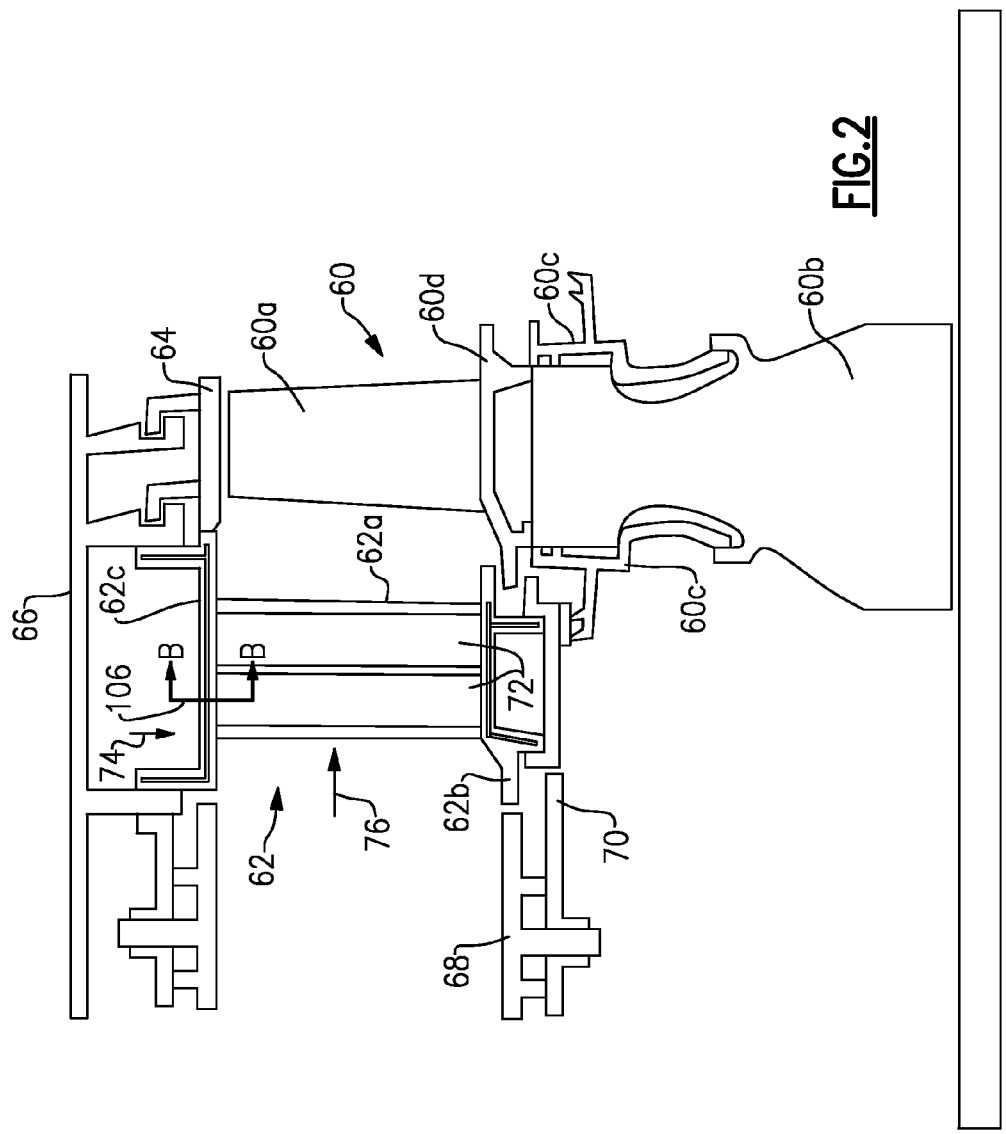
FIG. 2 is a schematic view of a vane and blade assembly.

Airfoils for blades and vanes located downstream of combustor section 26, such as stator vanes and rotor blades in the turbine section 28 for example, operate in a high-temperature environment. FIG. 2 shows a schematic representation of turbine blade 60 and associated turbine vane 62. The blade 60 includes an airfoil 60a that is mounted for rotation with a disk 60b about the engine center axis. A coverplate and seal assembly 60c is mounted for rotation with the disk 60b. A blade outer air seal (BOAS) 64 is positioned radially outward of a tip of the blade 60 and is coupled to an engine case structure 66.

The vane 62 includes an airfoil 62a, an inner platform 62b, and an outer platform 62c that is fixed to the engine case structure 66. The airfoil 62a extends between the inner 62b and outer 62c platforms. The inner platform 62b is positioned axially between a platform 60d of the blade 60 and a combustor panel 68. A combustor liner 70 is mounted to the combustor panel 68 and extends in aft direction toward the vane 62.

Figure 3:
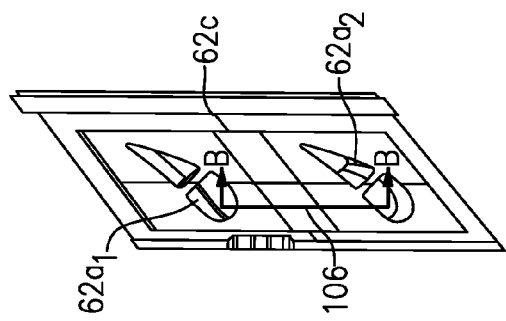
FIG. 3 is a top perspective view of an outer vane platform as identified in FIG. 2.

As shown in the side view of FIG. 2, the vane 62 includes baffles 72 that extend between the inner 62b and outer 62c platforms. A top view of the outer platform 62c (see arrow 74 in FIG. 2) is shown in FIG. 3. The vane 62 comprises a doublet configuration that is associated with a pair of airfoils $62a_1$ and $62a_2$.

Figure 4:
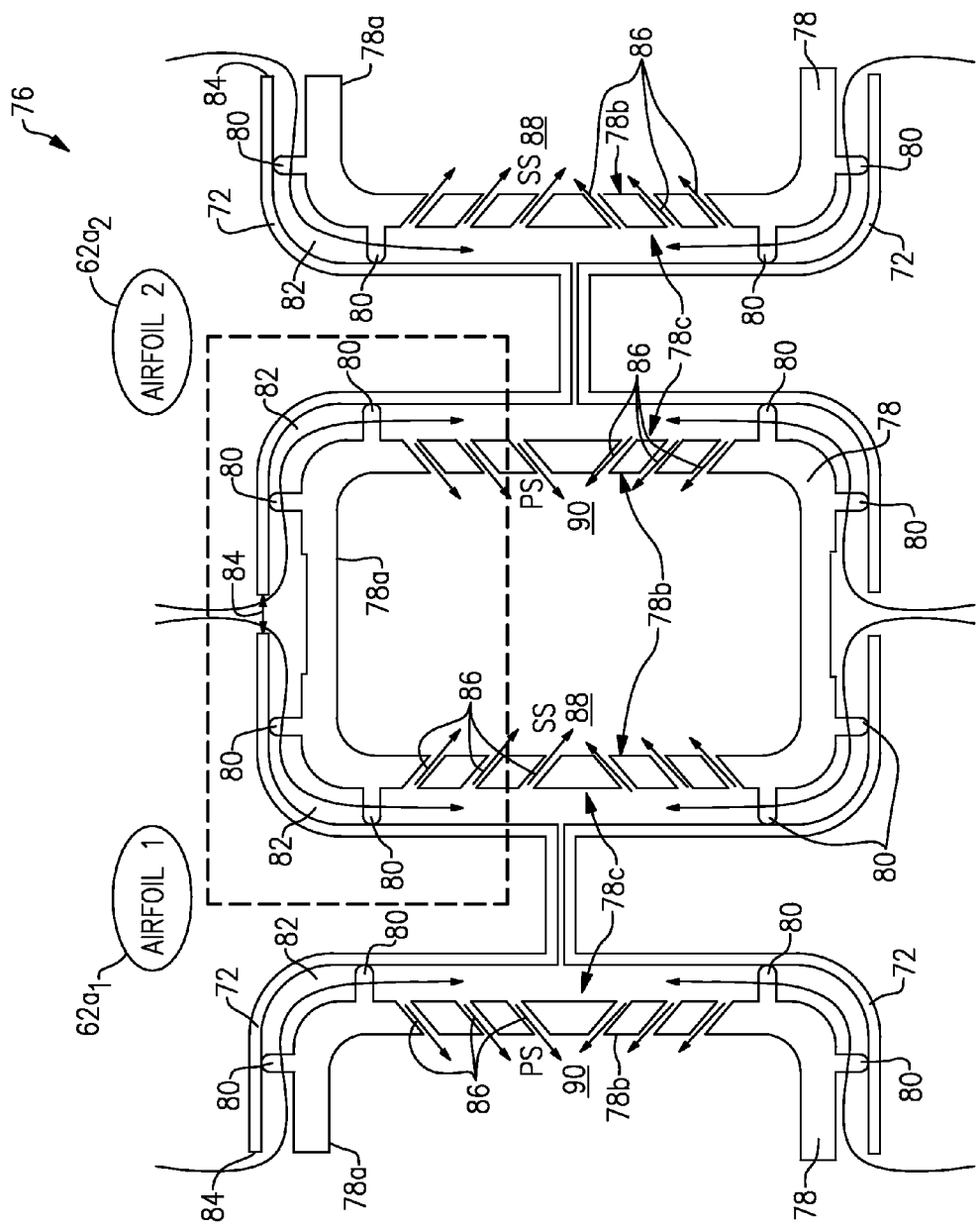
FIG. 4 is a front view of the vane as identified in FIG. 2.

A front view of the doublet vane configuration (see arrow 76 in FIG. 2) is shown in FIG. 4. A first component, the first airfoil $62a_1$, for example, is shown to the left in FIG. 4 and a second component, the second airfoil $62a_2$, for example, is shown to the right. A schematic representation of a casting 78 of the vane 62 is shown with the baffles 72 to show cooling flow patterns between adjacent airfoils $62a_1$ and $62a_2$. The castings 78 define external platform surfaces 78a, external airfoil surfaces 78b, and internal airfoil surfaces 78c. Baffle standoffs 80 created by the core extend between the casting 78 and the baffles 72. The standoffs 80 create channels 82 between outer surfaces of the baffles 72 and the internal airfoil surfaces 78c.

A gap 84 between baffle edges in the middle of the platform provides an entrance for cooling air flow. The air enters the gap 84 and then flows into the channels 82. A plurality of holes 86 are formed within the airfoils 62a to extend from the internal surface 78c to the external surface 78b. The holes 86 are formed in both a suction side 88 and in a pressure side 90. Flow from the channels 82 enters the holes 86 to cool the airfoils after cooling the platform.

Figure 5:
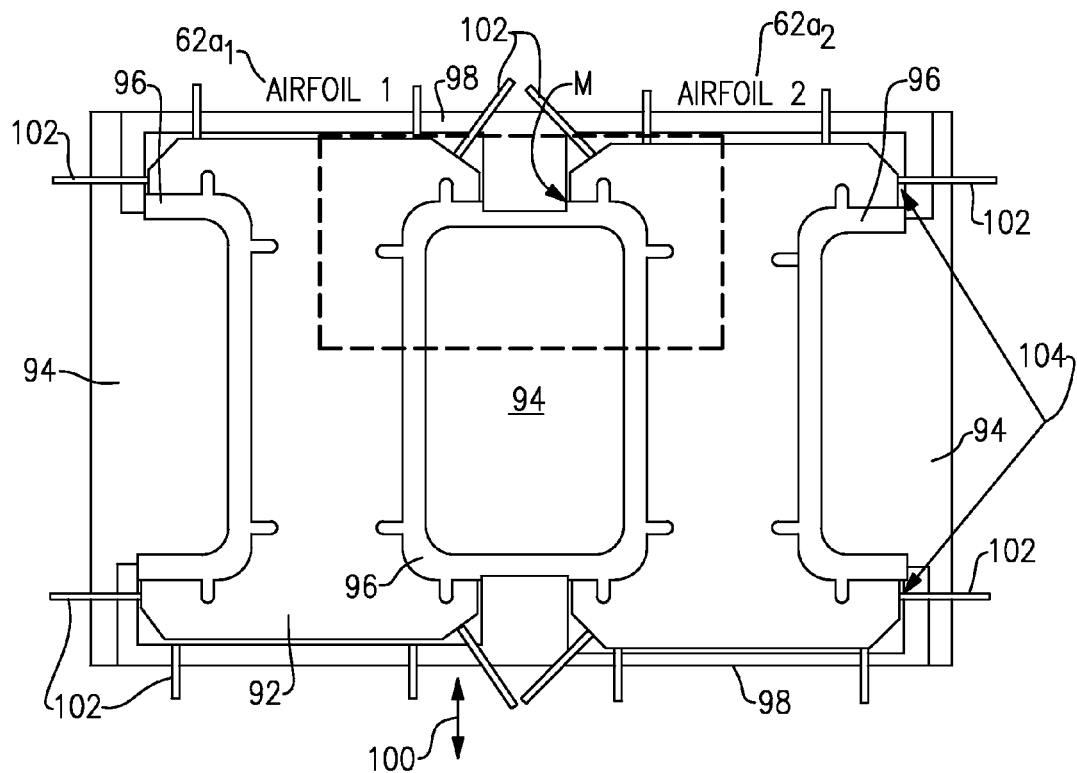
FIG. 5 is a schematic view of a casting process for the vane of FIGS. 2-3.

FIG. 5 is a view similar to FIG. 4 but shows a ceramic core 92 and wax die 94 used to create the airfoils $62a_1$ and $62a_2$. Wax 96 is located between the core 92 and die 94. A wax die end block 98 fits over the ceramic core 92 and slides radially inwardly and outwardly as indicated at 100. Locator pins 102 are used for adjustment purposes to center the core 92 within the wax die 94. The wax die end block 98 fits over the core 92 with small gaps 104 to account for locator pin adjustments, tolerances, and growth.

A mismatch M (FIG. 5) could exist due to ceramic core positioning, growth of the ceramic core, and wax die end block positioning. Cores 92 could be mis-positioned closer together or farther apart if the locator pins 102 are not adjusted properly.

Figure 6:
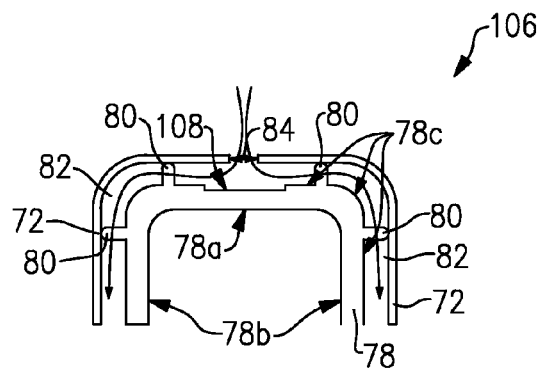
FIG. 6 is a section view of the outer vane platform and baffles as identified in FIG. 2.

FIG. 6 shows a section view as indicated at 106 in FIG. 3 and which is similar to FIG. 5, but with the core 92 and wax dies 94 removed. As discussed above, cooling flow enters the gap 84 in the middle of the platform and travels into the channels 82 to cool the platform before entering the airfoils. A pocket 108 is created in the wax by the core 92 and the end block 98 (FIG. 5). This pocket 108 can become shallower or deeper than that which is shown in FIG. 6 dependent upon shifting of the core 92 and/or end block 98.

FIGS. 7A-7C show a comparison of a nominal pocket 108a (FIG. 7A), a shallow pocket 108b (FIG. 7B), and a deep pocket 108c (FIG. 7C). A tolerance range is defined between a first set of tolerances and a second set of tolerances with a nominal tolerance condition being defined between the first and second sets of tolerances. A nominal tolerance position 110 is shown for the nominal tolerance condition in FIG. 7A, which defines a nominal channel height H1.

The baffle standoffs 80 force the baffles 72 to move with the core 92. If the core 92 (FIG. 5) shifts inward from the nominal position 110, as indicated at 112 in FIG. 7B, the baffle 72 moves inward too. The wax die end block 98 shifts outward as indicated at 114 and creates a shallow pocket 108b. This reduces cavity height to a minimum height H2 resulting in an increased pressure loss.

If the core 92 shifts outward from the nominal position 110, as indicated at 116 in FIG. 7C, the baffle 72 moves outward too. The wax die end block 98 shifts inward as indicated at 118 and creates a deep pocket 108c. This increases cavity height to a maximum height H3 resulting in reduced platform heat transfer.

In one example shown in FIGS. 8A-8C, a single piece coverplate 120 is used with the baffles 72; however, this configuration can lead to leakage gaps due to radial tolerances. A tolerance range is defined between a first set of tolerances and a second set of tolerances with a nominal tolerance condition being defined between the first and second sets of tolerances. A nominal tolerance position 122 is shown for the nominal tolerance condition in FIG. 8A, which defines a nominal channel height H1. The coverplate 120 is fit within the gap 84 and includes a slot 124 that allows cooling air flow to enter the channels 82. The coverplate 120 includes coverplate standoffs 126 that force the coverplate 120 to move with the pocket 108a. The baffle standoffs 80 force the baffles 72 to move with the core 92.

If the core 92 shifts inward from the nominal position 122, as indicated at 128 in FIG. 8B, the baffle 72 moves inward too. The wax die end block 98 shifts outward as indicated at 130 and creates a shallow pocket 108b. This reduces cavity height to a minimum height H2 resulting in an increased pressure loss. The shifting of the wax die end block 98 outward also forces the coverplate 120 to shift outwardly of the gap 84, which creates leak gaps 132. This baffle/coverplate mismatch allows air to leak between outer edges of the coverplate 120 and the baffles via the leak gaps 132 resulting in reduced platform heat transfer.

If the core 92 shifts outward from the nominal position 122, as indicated at 134 in FIG. 8C, the baffle 72 moves outward too. The wax die end block 98 shifts inward as indicated at 136 and creates a deep pocket 108c. This increases cavity height to a maximum height H3. The shifting of the wax die end block 98 inward also forces the coverplate 120 to shift inwardly through the gap 84 to create a leak path 138. This baffle/coverplate mismatch allows air to leak around the coverplate 120 via the leak paths 138, which reduces platform heat transfer.

FIGS. 9A-9C shows the single piece coverplate 120 as affected by core shifting in a circumferential direction. This configuration can lead to leakage gaps due to circumferential tolerances. A tolerance range is defined between a first set of tolerances and a second set of tolerances with a nominal tolerance condition being defined between the first and second sets of tolerances. A nominal tolerance position 140 is shown for the nominal tolerance condition in FIG. 9A. The coverplate 120 is fit within the gap 84 and includes the slot 124 that allows cooling air flow to enter the channels 82. The gap in FIG. 9A defines the nominal width W1 of the gap at the nominal tolerance position 140. The coverplate 120 includes coverplate standoffs 126 that force the coverplate 120 to move with the pocket 108a. The baffle standoffs 80 force the baffles 72 to move with the core 92.

If the cores 92 shift inward toward each other from the nominal position 140, as indicated at 142 in FIG. 9B, the baffles 72 move closer together as indicated at 144. The shifting of the baffles 72 toward each other reduces the size of the gap 84 to a minimum width W2. In this minimum tolerance condition the coverplate 120 does not fit within the gap 84.

If the cores 92 shift apart from each other relative to the nominal position 140, as indicated at 146 in FIG. 9C, the baffles 72 move farther away from each other as indicated at 148. The shifting of the baffles 72 away from each other increases the size of the gap 84 to a maximum width W3. In this maximum tolerance condition the coverplate 120 falls through the gap 84 creating leak gaps 150 that result in a reduction of platform heat transfer.

The subject invention, shown in FIGS. 10A-10C and 11A-11C, overcomes the issues described above with regard to FIGS. 8A-8C and 9A-9C by using two separate coverplates 200 with one coverplate 200 being associated with one baffle 72 independent of the other coverplate 200 and baffle 72. Each coverplate 200 includes at least one coverplate standoff 202 that forces the coverplates 200 to move with the pocket 108a. Further, each coverplate 200 includes at least one coverplate radial tab 204. The coverplate standoffs 202 extend in a radially inward direction from one side of a plate body and the coverplate radial tabs 204 extend in a radially outward direction from an opposite side of the plate body. In one example, the coverplate radial tabs 204 are circumferentially offset from the coverplate standoffs 202, i.e. the tabs 204 and standoffs 202 are not radially aligned with each other.

Each baffle 72 includes a baffle radial tab 206 that abuts directly against the coverplate radial tab 204. The baffle radial tabs 206 are positioned circumferentially outward of the coverplate radial tabs 204. The coverplate radial tabs 204 are positioned at outer edges 208 of the respective plate bodies. Opposite edges 210 of the plate bodies are spaced apart from each other to form a gap 212 that allows flow to enter the channels 82.

A tolerance range is defined between a first set of tolerances and a second set of tolerances with a nominal tolerance condition being defined between the first and second sets of tolerances. A nominal tolerance position 214 is shown for the nominal tolerance condition in FIG. 10A, which defines a nominal channel height H1. The coverplates 200 are fit within the gap 84 and are spaced apart to define the inlet gap 212. The coverplate standoffs 202 force the coverplates 200 to move in a radial direction with the pocket 108a. The baffle standoffs 80 force the baffles 72 to move with the core 92.

If the core 92 shifts inward from the nominal position 214, as indicated at 216 in FIG. 10B, the baffles 72 move inward too. The wax die end block 98 shifts outward as indicated at 218 and creates the shallow pocket 108b. This reduces cavity height to a minimum height H2. The shifting of the wax die end block 98 outward also forces the coverplates 200 to shift in a radial direction outwardly of the gap 84. The coverplate radial tabs 204 shift radially outward relative to the baffle radial tabs 206; however, the tabs 204, 206 are sized such that the tabs 204, 206 remain in direct contact with each other at the minimum height condition to prevent any gaps between the coverplates 200 and baffles 72. The tabs 204, 206 also provide a weld attachment surface to secure each coverplate 200 to a respective baffle 72.

If the core 92 shifts outward from the nominal position 214, as indicated at 220 in FIG. 10C, the baffle 72 moves outward too. The wax die end block 98 shifts inward as indicated at 222 and creates the deep pocket 108c. This increases cavity height to a maximum height H3. The coverplate radial tabs 204 shift radially inward relative to the baffle radial tabs 206; however, the tabs 204, 206 are sized such that the tabs 204, 206 remain in direct contact with each other at the maximum height condition to prevent any gaps between the coverplates 200 and baffles 72. Thus, the separate coverplates 200 and baffles 72 utilize respective radial tabs 204, 206 to prevent leaks caused by radial tolerances.

FIGS. 11A-11C show how the separate coverplates 200 and baffles 72 utilize the respective radial tabs 204, 206 to close gaps caused by circumferential tolerances. A tolerance range is defined between a first set of tolerances and a second set of tolerances with a nominal tolerance condition being defined between the first and second sets of tolerances. A nominal tolerance position 230 is shown for the nominal tolerance condition in FIG. 11A. The coverplates 200 are fit within the gap 84 and are spaced apart from each other to define the inlet gap 212 that allows cooling air flow to enter the channels 82. The inlet gap 212 in FIG. 11A defines the nominal width W1 of the gap 212 at the nominal tolerance position 230. The coverplate standoffs 202 force the coverplates 200 to move with the pocket 108a. The baffle standoffs 80 force the baffles 72 to move with the core 92.

If the cores 92 shift inward toward each other from the nominal position 230, as indicated at 232 in FIG. 11B, the baffles 72 move closer together as indicated at 234. The shifting of the baffles 72 toward each other also shifts the coverplates 200 closer to each other and reduces the size of the gap 212 to a minimum width W2. In this minimum tolerance condition cooling air can still enter the channels 82.

If the cores 92 shift apart from each other relative to the nominal position 230, as indicated at 236 in FIG. 11C, the baffles 72 move farther away from each other as indicated at 238. The shifting of the baffles 72 away from each other also shifts the coverplates 200 away from each other and increases the size of the gap 212 to a maximum width W3. The radial tabs 204, 206 of the respective coverplates 200 and baffles 72 remain in direct contact with each other during the shifting of the baffles 72 and cores 92 in the circumferential direction to close out any potential leak paths or gaps.

The subject invention splits a conventional coverplate into two separate coverplates and incorporates standoffs on the coverplates so that if the inner platform surface is out of place due to tolerances, the coverplates move with the surface, maintaining the correct channel height. Similarly, channel height in the airfoil can be maintained by the standard practice of using baffle standoffs created by the core. If the core position is out of place during the casting process due to core shift or tolerances, the baffle will be positioned accordingly by the baffle standoffs. As there are two coverplates, each coverplate can be mated with the corresponding baffle as the baffle position is varied part-to-part due to circumferential core shift and tolerances. This prevents any leakage gaps from opening up between the coverplate and the baffle due to circumferential variation. The subject invention also incorporates radial tabs on both the coverplates and the baffles. The radial tabs are long enough to prevent any leakage gaps from opening up due to variation part-to-part in radial core position.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine component assembly comprising:
a first component;
a second component circumferentially spaced from the first component relative to an engine center axis;
a first baffle associated with the first component;
a second baffle associated with the second component, wherein each of the first and second baffles includes at least one radial baffle tab;
a gap between the first and second baffles to define a cooling air inlet;
a first coverplate associated with the first baffle to cover a first portion of the gap;
a second coverplate associated with the second baffle to cover a second portion of the gap, wherein the first and second coverplates are separate from each other, and wherein each of the first and second coverplates includes at least one coverplate radial tab that cooperates with an associated at least one baffle radial tab to prevent leakage gaps between the first and second baffle plates and the first and second coverplates; and
wherein the first and second coverplates each include at least one plate standoff extending in a radial direction opposite from the at least one coverplate radial tab.

2. The component assembly according to claim 1 wherein the at least one plate standoff and the at least one coverplate radial tab are circumferentially offset from each other.

3. The component assembly according to claim 1 wherein the first component comprises a first airfoil extending from a platform and the second component comprises a second airfoil extending from a platform.

4. The component assembly according to claim 3 wherein the first and second airfoils comprise vanes.

5. The component assembly according to claim 3 wherein the first and second baffles include a baffle surface that faces an airfoil surface, and including channels formed between the baffle and airfoil surfaces, and wherein the first and second coverplates are positioned within the gap and spaced apart from each other to define an air inlet into the channels.

6. A gas turbine engine component assembly comprising:
a first component;
a second component circumferentially spaced from the first component relative to an engine center axis;
a first baffle associated with the first component;
a second baffle associated with the second component, wherein each of the first and second baffles includes at least one radial baffle tab;
a gap between the first and second baffles to define a cooling air inlet;
a first coverplate associated with the first baffle to cover a first portion of the gap;
a second coverplate associated with the second baffle to cover a second portion of the gap, wherein the first and second coverplates are separate from each other, and wherein each of the first and second coverplates includes at least one coverplate radial tab that cooperates with an associated at least one baffle radial tab to prevent leakage gaps between the first and second baffle plates and the first and second coverplates; and wherein a tolerance range is defined between a first set of tolerances and a second set of tolerances with a nominal tolerance condition being defined between the first and second sets of tolerances, and wherein a channel is provided between a baffle surface of the first and second baffles and a component surface of the first and second components, and wherein a nominal channel height is defined at the nominal tolerance condition, and wherein the at least one baffle radial tab and the at least one coverplate radial tab are located at a first position relative to each other when in the nominal tolerance condition, the at least one baffle radial tab and the at least one coverplate radial tab are located at a second position wherein the coverplate radial tab is radially outward of the first position and the baffle radial tab is radially inward of the first position when at the first set of tolerances, and the at least one baffle radial tab and the at least one coverplate radial tab are located at a third position wherein the coverplate radial tab is radially inward of the first position and the baffle radial tab is radially outward of the first position when at the second set of tolerances.

7. A gas turbine engine component assembly comprising:
a first component;
a second component circumferentially spaced from the first component relative to an engine center axis;
a first baffle associated with the first component;
a second baffle associated with the second component, wherein each of the first and second baffles includes at least one radial baffle tab;
a gap between the first and second baffles to define a cooling air inlet;
a first coverplate associated with the first baffle to cover a first portion of the gap;
a second coverplate associated with the second baffle to cover a second portion of the gap, wherein the first and second coverplates are separate from each other, and wherein each of the first and second coverplates includes at least one coverplate radial tab that cooperates with an associated at least one baffle radial tab to prevent leakage gaps between the first and second baffle plates and the first and second coverplates; and wherein a tolerance range is defined between a first set of tolerances and a second set of tolerances with a nominal tolerance condition being defined between the first and second sets of tolerances, and wherein a plate gap is provided between the first and second coverplates, and wherein a nominal plate gap is defined at the nominal tolerance condition, and wherein the plate gap is defined by a first distance when in the nominal tolerance condition, the plate gap is defined by a second distance that is circumferentially decreased relative to the first distance when at the first set of tolerances, and the plate gap is defined by a third distance that is circumferentially increased relative to the first distance when at the second set of tolerances.

8. A gas turbine engine component assembly comprising:
a first component;
a second component circumferentially spaced from the first component relative to an engine center axis, and wherein the first component comprises a first airfoil extending from a platform and the second component comprises a second airfoil extending from a platform;
a first baffle associated with the first component;
a second baffle associated with the second component, wherein each of the first and second baffles includes at least one radial baffle tab;
a gap between the first and second baffles to define a cooling air inlet;
a first coverplate associated with the first baffle to cover a first portion of the gap;
a second coverplate associated with the second baffle to cover a second portion of the gap, wherein the first and second coverplates are separate from each other, and wherein each of the first and second coverplates includes at least one coverplate radial tab that cooperates with an associated at least one baffle radial tab to prevent leakage gaps between the first and second baffle plates and the first and second coverplates;

wherein the first and second baffles include a baffle surface that faces an airfoil surface, and including channels formed between the baffle and airfoil surfaces, and wherein the first and second coverplates are positioned within the gap and spaced apart from each other to define an air inlet into the channels; and wherein the coverplate radial tabs and the baffle radial tabs are positioned at different radial positions relative to each other to maintain a desired channel height throughout a tolerance range defined by the first and second airfoils.

9. The component assembly according to claim 8 wherein the air inlet varies in a circumferential direction throughout the tolerance range.

10. A gas turbine engine comprising;
a compressor section defining an engine center axis; and
a turbine section downstream of the compressor section, the turbine section including a plurality of vane segments that are circumferentially attached to each other to form an array of vanes, wherein at least one of the vane segments comprises
a first baffle associated with a first vane,
a second baffle associated with a second vane, wherein each of the first and second baffles includes at least one baffle radial tab,
a gap between the first and second baffles to define a cooling air inlet;
a first coverplate associated with the first baffle to cover a first portion of the gap;
a second coverplate associated with the second baffle to cover a second portion of the gap, wherein the first and second coverplates are separate from each other and each of the first and second coverplates includes at least one coverplate radial tab that cooperates with an associated baffle radial tab to prevent leakage gaps between the first and second baffle plates and the first and second coverplates; and wherein each of the first and second coverplates includes a base plate extending between circumferentially spaced edges with the at least one radial plate tab extending radially outwardly from one of the edges.

11. The gas turbine engine assembly according to claim 10 wherein the first and second coverplates each include at least one plate standoff extending in a radial direction opposite from the at least one coverplate radial tab.

12. The gas turbine engine assembly according to claim 11 wherein the at least one plate standoff and the at least one coverplate plate tab are circumferentially offset from each other.

13. The gas turbine engine assembly according to claim 10 wherein associated coverplate radial tabs and baffle radial tabs are in direct abutting engagement with each other.

14. The gas turbine engine assembly according to claim 13 wherein the first and second baffles include a baffle surface that faces a vane surface, and including channels formed between the baffle and airfoil surfaces, and wherein the first and second coverplates are positioned within the gap and spaced apart from each other to define the cooling air inlet into the channels.

15. The gas turbine engine assembly according to claim 14 wherein the coverplate radial tabs and the baffle radial tabs are positioned at different radial positions relative to each other to maintain a desired channel height throughout a tolerance range defined by the first and second vanes.

16. The gas turbine engine assembly according to claim 14 wherein the cooling air inlet varies in a circumferential direction throughout the tolerance range.

17. The gas turbine engine assembly according to claim 16 wherein the cooling air inlet decreases in size relative to a nominal tolerance size when vanes are positioned circumferentially closer to each other than when the vanes are positioned at a nominal tolerance distance.

18. The gas turbine engine assembly according to claim 16 wherein the cooling air inlet increases in size relative to a nominal tolerance size when vanes are positioned circumferentially father apart from each other than when the vanes are positioned at a nominal tolerance distance.

* * * * *

UNITED STATES PATENT AND TRADEMARK OFFICE
CERTIFICATE OF CORRECTION

PATENT NO. : 9,771,814 B2  Page 1 of 1
APPLICATION NO. : 14/641470
DATED : September 26, 2017
INVENTOR(S) : Brandon W. Spangler et al.

It is certified that error appears in the above-identified patent and that said Letters Patent is hereby corrected as shown below:

In the Claims

In Claim 10, Column 12, Line 63; replace "one radial plate tab" with --one coverplate radial tab--

In Claim 14, Column 13, Line 13; replace "airfoil surfaces" with --vane surfaces--

In Claim 16, Column 14, Line 6; replace "the tolerance range" with --a tolerance range--

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*